US008809090B2

(12) United States Patent
Yang et al.

(10) Patent No.: US 8,809,090 B2
(45) Date of Patent: *Aug. 19, 2014

(54) ALL-SILICON RAMAN AMPLIFIERS AND LASER BASED ON MICRO RING RESONATORS

(75) Inventors: Xiaodong Yang, New York, NY (US); Chee Wei Wong, New York, NY (US)

(73) Assignee: The Trustees of Columbia University in the City of New York, New York, NY (US)

( * ) Notice: Subject to any disclaimer, the term of this patent is extended or adjusted under 35 U.S.C. 154(b) by 307 days.

This patent is subject to a terminal disclaimer.

(21) Appl. No.: 13/419,173

(22) Filed: Mar. 13, 2012

(65) Prior Publication Data

US 2012/0177080 A1  Jul. 12, 2012

Related U.S. Application Data

(60) Continuation of application No. 13/196,674, filed on Aug. 2, 2011, now Pat. No. 8,207,002, which is a continuation of application No. 12/392,634, filed on Feb. 25, 2009, now Pat. No. 8,017,419, which is a division of application No. 11/354,725, filed on Feb. 15, 2006, now Pat. No. 7,532,656.

(60) Provisional application No. 60/653,556, filed on Feb. 16, 2005.

(51) Int. Cl.
*H01L 21/00* (2006.01)
*H01S 3/083* (2006.01)

(52) U.S. Cl.
USPC .................................. 438/31; 438/29; 372/94

(58) Field of Classification Search
USPC ................. 438/29, 31, 32, 35; 372/30, 66, 94
See application file for complete search history.

(56) References Cited

U.S. PATENT DOCUMENTS

| 6,430,936 | B1 | 8/2002 | Ghoshal |
| 6,711,200 | B1 | 3/2004 | Scherer et al. |
| 6,757,474 | B2 | 6/2004 | Anderson et al. |

(Continued)

FOREIGN PATENT DOCUMENTS

| JP | 2002380726 | 8/2004 |
| WO | WO-2006014643 | 2/2006 |
| WO | WO-2007027982 | 3/2007 |

OTHER PUBLICATIONS

Akahane et al., "Investigation of high-Q channel drop filters using donor-type defects in two-dimensional photonic crystal slabl", Applied Physics Letter, 83, 1512-1514.

(Continued)

*Primary Examiner* — Kevin M Picardat
(74) *Attorney, Agent, or Firm* — Lisa A. Chiarini; Walter M. Egbert, III; Hughes Hubbard & Reed LLP

(57) ABSTRACT

Devices for generating a laser beam are disclosed. The devices include a silicon micro ring having at least one silicon optical waveguide disposed at a distance from the micro ring. The radius and the cross-sectional dimension of the micro ring, the cross-sectional dimension of the waveguide, and the distance between the micro ring and the waveguide are determined such that one or more pairs of whispering gallery mode resonant frequencies of the micro ring are separated by an optical phonon frequency of silicon. Methods of manufacturing a lasing device including a silicon micro ring coupled with a silicon waveguide are also disclosed.

21 Claims, 6 Drawing Sheets

(56) References Cited

U.S. PATENT DOCUMENTS

| | | |
|---|---|---|
| 6,798,947 B2 | 9/2004 | Iltchenko |
| 7,259,855 B2 | 8/2007 | Fan et al. |
| 7,346,251 B2 | 3/2008 | Bose et al. |
| 7,532,656 B2 | 5/2009 | Yang et al. |
| 2002/0118941 A1 | 8/2002 | Notomi et al. |
| 2002/0191905 A1 | 12/2002 | Prather et al. |
| 2003/0013109 A1 | 1/2003 | Ballinger et al. |
| 2003/0021301 A1 | 1/2003 | Vahala et al. |
| 2003/0076865 A1 | 4/2003 | Chang-Hasnain et al. |
| 2003/0156319 A1 | 8/2003 | John et al. |
| 2003/0161375 A1 | 8/2003 | Filgas et al. |
| 2004/0028090 A1 | 2/2004 | Pask et al. |
| 2004/0028358 A1 | 2/2004 | Cremer |
| 2004/0131097 A1 | 7/2004 | Deppe et al. |
| 2004/0207908 A1 | 10/2004 | Bastian et al. |
| 2005/0051870 A1 | 3/2005 | Yamazaki et al. |
| 2005/0111079 A1 | 5/2005 | Wang et al. |
| 2005/0111805 A1 | 5/2005 | Hertz et al. |
| 2006/0050744 A1 | 3/2006 | Wong et al. |
| 2006/0147169 A1 | 7/2006 | Sugita et al. |
| 2006/0151793 A1 | 7/2006 | Nagai |
| 2007/0025409 A1 | 2/2007 | Yang et al. |

OTHER PUBLICATIONS

Akahane Y. et al., "Fine-tuned high-Q photonic-crystal nanocavity", Opt. Exp., 13 (4), 1202-1214 (Feb. 2005).

Akahane, Y., T. Asano, B.-S. Song, and S. Noda, High-Q photonic nanocavity in two-dimensional photonic crystal, Nature 425, 944 (2003).

Altug H., and J. Vuckovic, "Two-dimensional coupled photonic crystal resonator arrays", Appl. Phys. Lett., 84 (2), 161-163 (Jan. 2004).

Arakawa Y. "Progress and prospect of quantum dot lasers,", Proceedings of SPIE, vol. 4580, pp. 179-185 (2001).

Armani, D.K., T. J. Kippenberg, and K. J. Vahala, Ultra-high-Q toroid microcavity on a chip, Nature 421, 925, 2003.

Baba T. et al., "Light localizations in photonic crystal line defect waveguides", IEEE J. Select Topics Quantum Electron., 10 (3), 484-491 (May/Jun. 2004).

Bienstman, P., S. Assefa, S. G. Johnson, J. D. Joannopoulos, G. S. Petrich, and L. A. Kolodziejski, Taper structures for coupling into photonic crystal slab waveguides, J. Opt. Soc. Am. B. 20 (9), 1817 (2003).

Bloembergen, N. and Y. R. Shen, Coupling Between Vibrations and Light Waves in Raman Laser Media, Phys, Rev. Lett. 12, 504 (1964).

Borselli M., T. J. Johnson, and O. Painter, "Beyond the Rayleigh scattering limit in high-Q silicon microdisks: theory and experiment", Opt. Exp., 13 (5), 1515-1530 (Mar. 2005).

Boyraz, O. and B. Jalali, "Demonstration of a silicon Raman laser", Opt. Express, 12, 5269-5273 (2004).

Boyraz, O. and B. Jalali, "Demonstration of directly modulated silicon Raman laser", Optics Express, 13(3), 796-800 (2005).

Campillo A.J., J. D. Eversole, and H.-B. Lin, Cavity QED Modified Stimulated and Spontaneous Processes in Microcavities, book chapter in R. K. Chang and A. J. Campillo (eds) Optical Processes in Microcavities, World Scientific, pp. 167-207 Singapore, (1996).

Chutinan A., and S. Noda, "Waveguides and waveguide bends in two-dimensional photonic crystal slabs", Phys. Rew. B, 62 (7), 4488-4492 (2000).

Claps R., D. Dimitropoulos, and B. Jalali, Stimulated Raman scattering in silicon waveguides, Elect. Lett. 38 (22), 1352-1354 (2002).

Claps, R. et al., "Influence of nonlinear absorption on Raman amplification in Silicon waveguides", Optics Express, 12(12), 2774-2780, (2004).

Claps, R., D. Dimitropoulos, V. Raghunathan, Y. Han, and B. Jalali, Observation of stimulated Raman amplification in silicon waveguides, Optics Express 11 (15), 1731 (2003).

Claps, R., et at, "Observation of Raman emission in silicon waveguides at 1.54 .mu.m," Opt. Express, 10, 1305-1313 (2002).

Claps, R., V. Raghunathan, D. Dimitropoulos, and B. Jalali, Anti-Stokes Raman conversion in silicon waveguides, Optics Express 11 (22), 2862 (2003).

International Search Report and Written Opinion issued for corresponding International Patetn Application No. PCT/US2006/034171.

Crookston M.B., "Single-Mode Raman Fiber Laser in a Multimode Fiber," Thesis, Department of the Air Force Air University, Air Force Institute of Technology, Wright-Patterson Air Force Base, Ohio (Mar. 2003).

Dimitropoulos D., B. Houshmand, R. Claps, and B. Jalali, Coupled-mode theory of the Raman effect in silicon-on-insulator waveguides, Optics Lett. 28 (20), pp. 1954-1956 (Oct. 2003).

Espinola, R.L. et al., "Raman amplification in ultrasmall silicon-in-insulator wire waveguides", Opt. Express, 12, 3713-3718 (2004).

Faist, J., "Silicon shines on", Nature, vol. 433, 691-692, (2005).

Florescu, L. and X. Zhang, "Semiclassical model of stimulated Raman scattering in photonic crystals", Physical Review E 72, 016611 (2005).

Garmire, E, E. Pandarese, and C. H. Townes, Coherently Driven Molecular Vibrations and Light Modulation, Phys. Rev. Lett. 11, 160 (1963).

Gersen H. et al., "Real-space observation of ultraslow light in photonic crystal waveguides", Phys. Rev. Lett., 94, pp. 073903-1-073903-4 (Feb. 2005).

Golovchenko, E., P. V. Mamyshev, A. N. Pilipetskii, and E. M. Dianov, Mutual Influence of the Parametric Effects and Stimulated Raman Scattering in Optical Fiberes, IEEE J. of Quan. Elect. 26 (10), 1815 (1990).

Han H.S., S. Y. Seo, J. H. Shin, N. Park, Coefficient determination related to optical gain in erbium-doped silicon-rich silicon oxide waveguide amplifier, App. Phys. Lett. 81 (20),pp. 3720-3722 (2002).

Hellwarth, R.W., Theory of Stimulated Raman Scattering, Phys. Rev. 130, 1850 (1963).

Hook, A., "Influence of stimulated Raman scattering on cross-phase modulation between waves in optical fibers", Optics Letter, vol. 17, No. 2, (1992).

International Search Report and Written Opinion from International patent Application No. PCT/US05/25581, mailed Jun. 26, 2008.

Ippen, E.P. and R. H. Stolen, Stimulated Brillouin scattering in optical fibers, Appl. Phys. Lett. 21 (11), 539 (1972).

Johnson S.G. et al., "Linear waveguide in photonic crystal slabs", Phys. Rev. B, 62 (12), 8212-8222 (2000).

Johnson S.G., S. Fan, A. Mekis, and J. D, Joannopoulos, Multipole-cancellation mechanism for high-Q cavities in the absence of a complete photonic band gap, Appl. Phys. Lett., vol. 78 (22), 3388-3390, (2001).

Johnson, S.G., and J. D. Joannopoulos, Block-iterative frequency-domain methods for Maxwell's equations in a planewave basis <http://www.opticsexpress.org/oeachive/source/27937.htm>, Optics Express 8, 173 (2001).

Jones R. et al., "Lossless optical modulation in a silicon waveguide using stimulated Raman scattering", Opt. Exp., 13 (5), 1716-1723 (Mar. 2005).

Jones, R. et al., "Net continuous wave opticall gain in a low loss silicon-on-insulator waveguide by stimulated Raman scattering", Opt. Exp., 13(2), 519-525 (2005).

Kippenberg, T. et al., "Theoretical and Experimental Study of Stimulated and Cascaded Raman Scattering in Ultrahigh-Q Optical Microcavities", IEEE Journal of Selected Topics in Quantum Electronics, 10(5), 1219-1228 (2004).

Kippenberg, T.J. et al., "Ultralow-threshold Raman laser using a spherical dielectronic chip," Optics Letters, 29, 1224-1226 (2004).

Koonath P., T. Indukuri, and B. Jalali, "Vertically-coupled microdisk resonators realized using three-dimensional sculpting in silicon," Appl. Phys. Lett., 85, 1018-1020 (Aug. 2004).

Karle, T.J. et al. "Observation of Pulse Compression in Photonic Crystal Coupled Cavity Waveguides," Journal of Lightwave Technology, vol. 22, No. 2, pp. 514-519, Feb. 2004.

Kotlyar, M.V., T. Karle, M. D. Settle, L. O'Faolain, and T. F. Krauss, Low-loss photonic crystal defect waveguides in InP, Appl. Phys. Lett. 84 (18), 3588 (2004).

(56) References Cited

OTHER PUBLICATIONS

Krause, M. et al., "Analysis of Raman lasing characteristics in silicon-on-insulator waveguides", Optics Express, 12(23), 5703-5710, (2004).
Kwon, S.-H., H.-Y. Ryu, G.-H. Kim, Y.-H. Lee and S.-B. Kim, Photonic bandedge lasers in two-dimensional squate-lattice photonic crystal slabs, App. Phys. Lett. 83 (19), 3870 (2003).
Liang T.K. and H. K. Tsang, "Efficient Raman amplification in silicon-on-insulator waveguides," Appl. Phys. Lett., 85, 3343-3345 (Oct. 2004).
Liang, T.K. and H.K. Tsang, "Role of free carriers from two-photon absorption in Raman amplification in silicon-on-insulator waveguides", Applied Physics Letter, 84(15), 2745-2747 (2004).
Lin, H.-B, and A.J. Campillo, "Microcavity enhanced Raman gain", Optics Communications 133, 287-292, (1997).
Lin, H.-B., and A. J. Campillo, cw Nonlinear Optics in Droplet Microcavities Displaying Enhanced Gain, Phys. Rev. Lett. 73 (18), 2440 (1994).
Lin, S. Y., E. Chow, S. G. Johnson, and J. D. Joannopoulos, Demonstration of highly efficient waveguiding in a photonic crystal slab at the 1.5-.mu.m wavelength, Optics Lett. 25 (17), 1297 (2000).
Liu, A. et al., "Net optical gain in a low loss silicon-on-insulator waveguide by stimulated Raman scattering", Opt. Express, 12, 4261-4268 (2004).
Lončar, M., J. Vučković, and A. Scherer, Methods for controlling positions of guided modes of photonic-crystal waveguides, J. Opt. Soc. Am. B. 18 (9), 1362 (2001).
Lu, Z, H., D. J. Lockwood, J.-M. Baribeau, Quantum confinement and light emission in $SiO_2/Si$ superlattices, Nature 378, 258 (1995).
Matsko, A.B. et al., "On cavity modification of stimulated Raman scattering", J, Opt. B: Quantum Semiclass. Opt., 5, 272-278 (2003).
McKeever, J., A. Boca, A. D. Boozer, R. Miller, J. R. Buck, A. Kuzmich, and H. J. Kimble, Deterministic Generation of Single Photons from One Atom Trapped in a Cavity, Science 303, 1992 (2004).
Mekis A., S. Fan, and J. D. Joannopoulos, "Bound states in photonic crystal waveguides and waveguide bends", Phys. Rev. B, 58 (8), 4809-4817 (1998).
Michler, P., A. Kiraz, C. Becher, W, V. Schoenfeld, P. M. Petroff, L. Zhang, E. Hu, and A. Imano{hacek over (g)}lu, A Quantum Dot Single-Photon Turnstile Device, Science 290, 2282 (2000).
Min, B., T. J. Kippenberg, and K. J. Vahala, Compact, fiber-compatible, cascaded Raman laser, Optics Lett. 28 (17), 1507 (2003).
Non Final Office Action mailed Feb. 26, 2008 for U.S. Appl. No. 11/185,031, filed Jul. 20, 2005.
Notomi, M., K. Yamada, A. Shinya, J. Takahashi, C. Takahashi, and I. Yokohama, Extremely Large Group-Velocity Dispersion of Line-Defect Waveguides in Photonic Crystal Slabs, Phys. Rev. Lett. 87 (25), 253902 (2001).
Park et al., "Electrically driven single-cell photonic crystal laser", Science, 305, pp. 1444-1447 (Sep. 2004).
Pavesi L. and D. J. Lockwood, Silicon Photonics, (Springer-verlag, New York, 2004).
Pavesi, L., L. Dal Negro, C. Mazzoleni, G. Franzo, and F. Priolo, Optical gain in silicon nanocrystals, Nature 408, 440 (2000).
Pelton, M., C. Santori, J. Vu{hace over(c)} kovi, B. Zhang, G. S. Solomon, J. Plant, and Y. Yamamoto, Efficient source of Single Photons: A Single Quantum Dot in a Micropost Microcavity, Phys. Rev. Lett. 89 (23), 233602 (2002).
Polman, A., B. Min, J. Kalkman, T. J. Kippenberg, and K. S. Vahala, Ultralow-threshold erbium-implanted toroidal microlaser on silicon, Appl. Phys. Lett. 84 (7), 1037, 2004.
Qian, S-X., and R, K. Chang, Multiorder Stokes Emission from Micrometer-Size Droplets, Phys. Rev. Lett. 56 (9), 926 (1986).
Rakich P.T et al., "Nano-scale photonic crystal microcavity characterization with an all-fiber based 1.2-2.0 um supercontinuum", 13 (2), 821-825 (Feb. 2005).

Ralston, S.M. and R.K. Chang, "Spontaneous-Raman-Scattering Efficiency and Stimulated Scatttering in Silicon", Physical Review B, vol, 2, No. 6, 1858-1862, (1970).
Reed G.T. and A.P. Knights, Silicon Photonics: An Introduction (John Wiley, West Sussex, 2004).
Renucci, J.B., R. N. Tyte, and M. Cardona, Resonant Raman scattering in silicon, Phys. Rev. B 11 (10), 3885 (1975).
Rong, H. et al., "A continuous-wave Raman silicon laser", Nature, 433, 725-728 (2005).
Rong, H. et al., "An all-silicon Raman laser", Nature, 433, 292-294 (2005).
Ryu H.Y. and M. Notomi, "High quality-factor whispering-gallery mode in the photonic crystal hexagonal disk cavity," Opt. Express, 12, 1708-1719 (Apr. 2004).
Ryu, H.-R., S.-H. Kwon, Y.-J. Lee and Y.-H. Lee and J.-S. Kim, Very-low-threshold photonic band-edge lasers from free-standing triangular photonic crystal slabs, App. Phys. Lett. 80 (19), 3476 (2002).
Sakoda K., Optical Properties of Photonic Crystals, Springer-Verlag, New York, 2001.
Scheuer J. et al., "Coupled resonator optical waveguides: toward the slowing and storage of light", Optics & Photonics News, 36-40, (Feb. 2005).
Shen, Y.R., The Principles of Nonlinear Optics, Wiley, Hoboken, New Jersey, 2003; Y. R. Shen and N. Bloembergen, Theory of Stimulated Brillouin and Raman Scattering, Phys. Rev. 137 (6A), A1787 (1965).
Solijacic M., and J. D. Joannopoulos, "Enhancement of nonlinear effects using photonic crystals", Nature materials, 3, 211-219 (Apr. 2004).
Song B.S. et al., "Ultra-high-Q photonic double-heterostructure nanocavity", Nature materials, 4, 2007-210 (Jun. 2005).
Song et al, "Photonic devices based on in-plane hetero photonic crystals", Science, 300, 1537 (Jun. 2003).
Spillane, S.M., T. J. Kippenberg, and K. J. Vahala, Ultralow-threshold Raman laser using a spherical dielectric microcavity, Nature 415, 621 (2002).
Srinivasan K. and O. Painter, "Momentum space design of high-Q photonic crystal optical cavities," Opt. Express 10, 670-684 (2002.
Srinivasan, K., P. E. Barclay, and O. Painter, Optics Express 12, 1458 (2004).
Srinivasan, K., P. E. Barclay, O. Painter, J. Chen, A. Y. Cho, and C. Gmachl, Experimental demonstration of a high quality factor photonic crystal microcavity, App. Phys. Lett. 83 (10), 1915 (2003).
Stoica T. et al., "Electroluminescence on electron hole plasma in strained SiGe epitaxial layers," Physica E 16, pp. 359-365 (Mar. 2003).
Stolen, R.H. and E.P. Ippen, "Raman gain in glass optical waveguides", Appl. Phys. Lett., vol. 22, No. 6, (1973). Sugitatsu A., T. Asano, and S. Noda, "Characterization of line-defect-waveguide lasers in two-dimensional photonic-crystals slabs", Appl. Phys. Lett., 84 (26), 5395-5397 (Jun. 2004).
Talneau, A., Ph. Lalanne, M. Agio, and C. M. Soukoulis, Low-reflection photonic-crystal taper for efficient coupling between guide sections of arbitrary widths, Optics Lett. 27, 1522 (2002).
Temple, P.A., and C. E. Hathaway, Multiphonon Raman Spectrum of Silicon, Phys. Rev. B 7 (8), 3685 (1973).
Thiyagarajan SMK et al., "The effect of scaling microlasers on modal noise," Appl. Phys. Lett, vol. 69, pp. 3459-3461 (Dec. 1996).
Trupke, T., J. Zhao, A. Wang, R. Corkish, and M. A, Green, Very efficient light emission from bulk crystalline silicon, Appl, Phys. Lett. 82 (18), 2996 (2003).
Tsang H.K. et al., "Optical dispersion, two-photon absorption and self-phase modulation in silicon waveguides at 1.5 .mu.m wavelength, " Appl. Phys. Lett., 80, 416-418 (2002).
Vernooy, D,W., V. S. Ilchenko, H. Mabuchi, E. W. Streed, H. J. Kimble, High-Q measurements of fused-silica microspheres in the near infrared, Optics Lett. 23 (4), 247 (1998).
Vuckovic, J., M. Lon{hacek over (c)} ar, H. Mabuchi, and A. Schere, Phys. Rev. E 65, 016608 (2002).
Wong CW et al., "Enhancement of stimulated Raman lasing with slow-light photonic crystal waveguides in monolithic silicon," Paper, Columbia University, 3 pages.

(56) References Cited

OTHER PUBLICATIONS

Woodbury and al., "Ruby laser Operation in the near IR", Proc. IRE 50, 2347 (1962).

Wu, Y. et al., "Theory of microcavity-enhanced Raman gain" Optics Letters, vol. 24, No. 5, 345-347, (1999).

Xu, Q. et al., Time-resolved study of Raman gain in highly confined silicon-on-insulator waveguides, Opt. Express, 12, 4437-4442 (2004).

Yang et al., Design of photonic band gap nanovavities for stimulated Raman amplification and lasing in monolithic silicon, Optic Express vol. 13, pp. 4723-4730 (Jun. 2005).

Yang X., J. Yan, and C.W. Wong, "Design and fabrication of L5 photonic band gap nanovavities for stimulated Raman amplification in monolithic silicon", CLEO/QELS, Baltimore, Maryland, pp. 352-354 (Jun. 2005).

Yariv, A., Y. Xu, R. K. Lee, and A. Scherer, Coupled-resonator optical waveguide: a proposal and analysis, Optics Lett. 24, 711 (1999).

Yokoyama, H., and S. D. Brorson, Rate equation analysis of microcavity laser, J. Appl. Phys. 66 (10), 4801 (1989). Yoshie et al., "Vacuum Rabi splitting with a single quantum dot in a photonic crystal nanocavity", Nature, 432, pp. 200-203 (Nov. 2004).

Yoshie, T., M. Loncar; A. Scherer, and Y. Qiu, High frequency oscillation in photonic crystal nanolasers, App. Phys. Lett. 84 (18), 3543 (2004).

Zhang Y. et al., "Small-volume waveguide-section high Q microcavities in 2D photonic crystal slabs," Opt. Express, 12, 3988-3995 (Aug. 2004).

Zheng, B., J. Michel, F. Y. G. Ren, L. C. Kimerling, D. C. Jacoboson, J. M. Poate, Room-temperature sharp line electroluminescence at .lamda.=1.54 .mu.m from an erbium-doped, silicon light-emitting diode, App. Phys. Lett. 64 (21), 2842 (1994).

ALL-SILICON RAMAN AMPLIFIERS AND LASER BASED ON MICRO RING RESONATORS

CROSS-REFERENCE TO RELATED APPLICATIONS

This application is a continuation of U.S. patent Ser. No. 13/196,674, filed Aug. 2, 2011, which is a continuation of U.S. patent Ser. No. 12/392,634, filed Feb. 25, 2009, now U.S. Pat. No. 8,017,419, which is a division of U.S. patent Ser. No. 11/354,725, filed Feb. 15, 2006, now U.S. Pat. No. 7,532,656, which claims priority to U.S. Provisional Application No. 60/653,556, filed Feb. 16, 2005.

FIELD

The present invention relates to optical amplification and lasing devices, and methods for manufacturing the devices. More particularly, the present invention relates to low-threshold microcavity Raman lasers, and methods for manufacturing the same.

BACKGROUND

Stimulated Raman scattering ("SRS") has a rich and evolving history since the development of the laser. In 1962, SRS effect at infrared frequencies was discovered. This discovery was soon described as a two-photon process with a full quantum mechanical calculation. To account for anti-Stokes generation and higher-order Raman effects, however, coupled-wave formalism was adopted to describe the stimulated Raman effect. Self-focusing was later included to account for the much larger gain observed in SRS. These understandings facilitated the study and design of Raman amplifiers and lasers. For example, low-threshold microcavity Raman lasers have been demonstrated in silica micro spheres and micro disks using excited whispering gallery modes ("WGMs"). Such devices can play an important role in the developing technology of photonic integrated circuits.

Because silicon is being considered as a promising platform for photonic integrated circuits, silicon based photonic devices have been increasingly researched. Microscopic passive silicon photonic devices such as bends, splitters, and filters have been developed. Active functionalities in highly integrated silicon devices have been studied, such as optical bistability due to the nonlinear thermal-optical effect and fast all-optical switching with two-photon absorption.

Silicon based Raman amplifiers and lasers also have been studied. The bulk Raman gain coefficient $g_R$ in silicon is $10^4$ times higher than in silica. Light generation and amplification in planar silicon waveguides with Raman effects have been studied recently. Raman lasing using a silicon waveguide as the gain medium has been demonstrated, where the ring laser cavity is formed by an 8-m-long optical fiber. A Raman laser using an S-shaped 4.8-cm-long silicon waveguide cavity with multi-layer coatings has also been reported, which could be integrated onto CMOS-compatible silicon chips.

Despite these advances, microscopic low-threshold Raman amplification and lasing devices on a monolithic silicon chip has yet to be developed. Such devices would support the development towards efficient, all-optical photonic integrated circuits.

SUMMARY

Embodiments of the present invention provide all-optical on-chip signal amplification and lasing. In particular, embodiments of the present invention include Raman amplification and lasing devices using on-chip micro ring resonators coupled with waveguides in monolithic silicon. Embodiments of the present invention also provide methods for manufacturing such devices. According to embodiments of the present invention, lasers are designed with geometries so that WGM resonant frequencies of the micro ring resonator match the pump-Stokes frequency spacing of SRS in monolithic silicon. Therefore, one or more pairs of pump and Stokes light can form WGMs in the micro ring resonator.

Devices for generating a laser beam are disclosed. In some embodiments, the devices include a silicon micro ring having a radius and a cross-sectional dimension, and at least one silicon optical waveguide having a cross-sectional dimension and disposed at a distance from the micro ring. The distance, the radius, and the cross-sectional dimensions are determined so that at least one pair of whispering gallery mode resonant frequencies of the micro ring are separated by an optical phonon frequency of silicon.

Methods of manufacturing a lasing device including a silicon micro ring coupled with a silicon waveguide are disclosed. In some embodiments, the methods include determining a radius and a cross-sectional dimension of the micro ring, a cross-sectional dimension of the waveguide, and a distance between the micro ring and the waveguide, so that at least one pair of whispering gallery mode resonant frequencies of the micro ring are separated by an optical phonon frequency of silicon. The methods also include manufacturing the lasing device by creating the micro ring with the determined radius and cross-sectional dimension, creating the waveguide with the determined cross-sectional dimension, and disposing the micro ring from the waveguide at the determined distance.

BRIEF DESCRIPTION OF THE DRAWINGS

The Detailed Description of the Invention, including the description of various embodiments of the invention, will be best understood when read in reference to the accompanying figures.

FIG. 1b is a cross-sectional view of the Raman amplification and lasing device in FIG. 1a.

DETAILED DESCRIPTION

Devices of various embodiments of the present invention use micro ring resonators as a cavity for producing Raman laser. The strong light confinement of a micro ring resonator enhances the stimulated Raman scattering with low-threshold pump power.

Figure 1A:
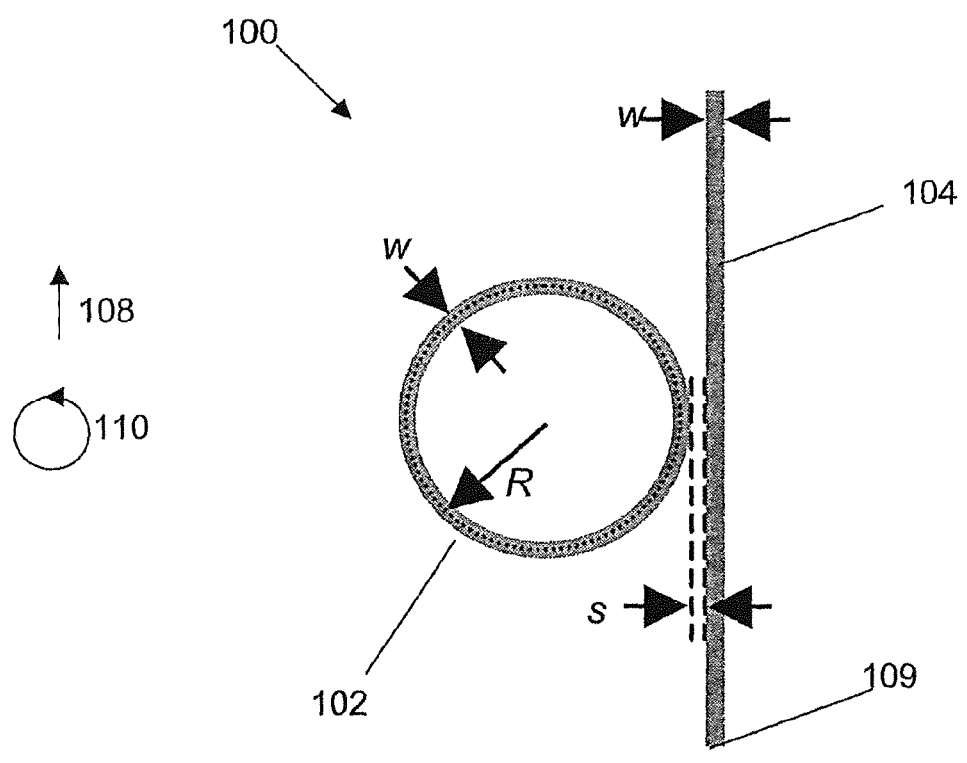
FIG. 1a is a top view of a Raman amplification and lasing device in accordance with various embodiments of the present invention.
Figure 1B:
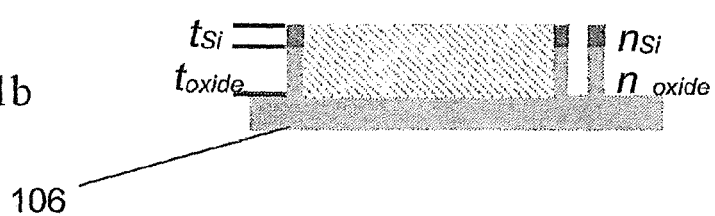

FIG. 1a is a top view and FIG. 1b is a cross-sectional view of a Raman amplification and lasing device of various embodiments of the present invention, generally at 100. Device 100 includes an optical micro ring resonator 102 and an optical waveguide 104, both made of silicon. The cross-sectional view illustrates a cross section of device 100 taken by a plane perpendicular to the sheet and passing through the center of micro ring resonator 102.

In some embodiments, waveguide 104 can be a quasi-transverse electric ("quasi-TE") single-mode waveguide. As shown, micro ring resonator 102 has radius R. Micro ring resonator 102 and waveguide 104 can have the same width w and height $t_{si}$. There is a gap s between resonator 102 and waveguide 104. Resonator 102 and waveguide 104 can be formed on top of a layer of silicon oxide ($SiO_2$) 106. In some embodiments, device 100 can include more than one waveguide disposed at a close distance to resonator 102. Although waveguide 104 is shown to be straight in FIG. 1, it can assume other shapes as known in the art.

In operation, pump light can enter the lower end 109 of waveguide 104 in the direction of arrow 108. This pump light can induce pump light in resonator 102 in the direction of arrow 110 by a coupling effect. When resonator 102 is stimulated, Stokes light in resonator 102 is generated by Raman scattering, which causes Stokes light leaving the upper end of waveguide 104 by the coupling effect.

Stimulated Raman scattering in micro ring resonator 102 is a two-photon process related to the optical phonons. The strongest Stokes peak arises from single first-order Raman-phonon (three-fold degenerate) at the Brillouin zone center. The coupling between the pump and Stokes lightwaves in SRS can be described by Maxwell's equations using nonlinear polarizations $P^{(3)}$:

$$\nabla \times (\nabla \times E_s) + \frac{1}{c^2}\frac{\partial^2}{\partial t^2}(\varepsilon_s E_s) = -\frac{1}{c^2}\frac{\partial^2}{\partial t^2}(P_s^{(3)}) \quad (1)$$

$$\nabla \times (\nabla \times E_p) + \frac{1}{c^2}\frac{\partial^2}{\partial t^2}(\varepsilon_p E_p) = -\frac{1}{c^2}\frac{\partial^2}{\partial t^2}(P_p^{(3)}) \quad (2)$$

The nonlinear polarization $P_S^{(3)}$ is cast as $\chi_{jkmn}^{(3)} E_p E_p^* E_s$, where $\chi_{jkmn}^{(3)}$ is the third-order fourth-rank Raman susceptibility, and can be calculated in terms of the Raman tensor $\overline{R}_j$. The $E_p$ and the $E_s$, are electric fields of the pump and Stokes waves respectively.

In micro ring resonator 102, it can be shown that the cavity SRS enhancement results from the intensity build up in the cavity, so that the threshold pump power depends on the quality factor Q and also the coupling efficiencies. The intensity build up factor for the cavity mode is:

$$I_c/I_0 = (Q\lambda)/(\pi^2 nR) \quad (3)$$

where $I_0$ is the intensity of the input light, $I_c$ is the effective intensity of the light in the cavity, $\lambda$ is the light wavelength, n is the refraction index of the micro ring resonator 102 host material, and R is the radius of the micro ring resonator 102. The effective interaction length is:

$$L_c = (Q\lambda)/(2\pi n) \quad (4)$$

Both pump mode and Stokes mode can be WGMs with quality factors $Q_p$ and $Q_s$, respectively. The condition for Raman lasing is that the gain exceeds the losses:

$$g_R \xi I_{c,pump} > L_{c,Stokes}^{-1} \quad (5)$$

Assume that the modal volume is $V_m \approx 2\pi RA$, the threshold pump power $P_{th} = I_0 A$ is:

$$P_{th} = \frac{\pi^2 n^2}{\xi g_R Q_s Q_p} \frac{V_m}{\lambda_p \lambda_s} \quad (6)$$

where the parameter $\xi < 1$ describes the coupling to the pump mode and the overlap between the pump and Stokes modes, A is the effective cross-sectional area of the cavity mode, and $g_R$ is the bulk Raman gain coefficient of silicon, which is about 70 cm/GW for Stokes radiation in the 1550-nm range.

Because the quality factors $Q_s$ and $Q_p$ of pump mode and Stokes mode are relatively high, threshold power $P_{th}$ can be made very low. Therefore, by designing a highly confined micro ring resonator 102 that supports pump and Stokes modes, a microscopic low-threshold on-chip amplification and lasing device 100 can be fabricated.

The following describes the design of device 100 that supports one or more pump and Stokes modes. Device 100 can be designed by numerically solving Maxwell's equations (1) and (2) with a boundary condition corresponding to the geometry of device 100, using a three-dimensional finite-difference time-domain (3D FDTD) method. With a 3D FDTD method, a transmission spectrum of device 100, resonant wavelengths, WGM field profiles, and quality factor Q of the resonant wavelengths can all be calculated. This can be performed with any software that numerically solves the Maxwell's equations (1) and (2), such as the FullWAVE™ software provided by RSoft Design Group, Inc. (Ossining, N.Y.).

An important goal of the design is to determine iteratively (i.e., fine-tune) the geometry of device 100 so that WGM resonant frequencies of micro ring resonator 102 corresponds to one or more pairs of pump and Stokes frequencies. A pump frequency and a corresponding Stokes frequency are spaced apart by $\Delta_v = 15.6$ THz, which is the optical phonon frequency in monolithic silicon. If a pair of WGM resonant frequencies are separated by 15.6 THz, a pump light having one of the pair of frequencies can be used to generate a Stokes light having the other frequency, and both the pump and the Stokes light can form WGMs in resonator 102.

If it is desirable that device 100 supports pump and Stokes lights with wavelengths close to a predetermined wavelength (e.g., 1550 nm), the geometry of device 100 can be determined iteratively so that wavelengths corresponding to the WGM resonant frequencies of resonator 102 are close to the predetermined wavelength (e.g., within the range of about 1400 nm to about 1600 nm). However, device 100 is not limited by the example provided; device 100 can also be designed to support pump and Stokes lights with wavelengths within other suitable ranges.

According to various embodiments of the present invention, a numerical design process can include determine iteratively the geometry of device 100 and calculating the corresponding transmission spectrum of waveguide 104 with, for example, a 3D FDTD method. The drops in the transmission spectrum correspond to WGM resonant frequencies of resonator 102. From the transmission spectrum, a pump wavelength $\lambda_p$ can be chosen, such that $\lambda_p$ corresponds to a drop in the transmission spectrum. Then, the Stokes wavelength can be calculated with $\lambda_s = \lambda_p + \lambda_p^2/(c/\Delta v - \lambda_p)$. Stokes wavelength $\lambda_s$ should also correspond to a drop in the transmission spectrum. Quality factors $Q_p$ and $Q_s$ can then be calculated with $Q = \lambda/\Delta\lambda_{FWHM}$ from the transmission spectrum.

Determining iteratively the geometry of device 100 can include determining iteratively the radius R of resonator 102, the width w and the height $t_{Si}$ of waveguide 104 and micro ring resonator 102, and the gap s between waveguide 104 and resonator 102, so that the transmission spectrum of waveguide 104 have certain desired properties. For example, width w and height $t_{Si}$ can be changed it to shift the high Q resonant spectrum of device 100 to a range close to 1550 nm. A starting point for the iterative determination of width w and height $t_{Si}$ can be values that support a quasi-TE single-mode waveguide 104. Radius R can be determined iteratively so that optical phonon frequency (15.6 THz) is an integer multiple of the free spectral range, which is the spacing between the neighboring WGM resonant frequencies of resonator 102 (the WGM resonant frequencies corresponds to drops in the transmission spectrum of the waveguide). Gap s can be determined iteratively to achieve a good electromagnetic coupling efficiency into and out of resonator 102 for different wavelength ranges.

As an example, device 100 can be designed with w equals to 350 nm, $t_{Si}$ equals to 200 nm, s equals to 150 nm, and R equals to 4.9 μm. In this example, the cross-sectional dimension of waveguide 104 as represented by w and $t_{Si}$ supports a quasi-TE single-mode. Height $t_{oxide}$ of $SiO_2$ layer 106 can be 400 nm. The refraction index of silicon and $SiO_2$ can be $n_{Si}$=3.48 and $n_{oxide}$=1.46 respectively.

Figure 2:
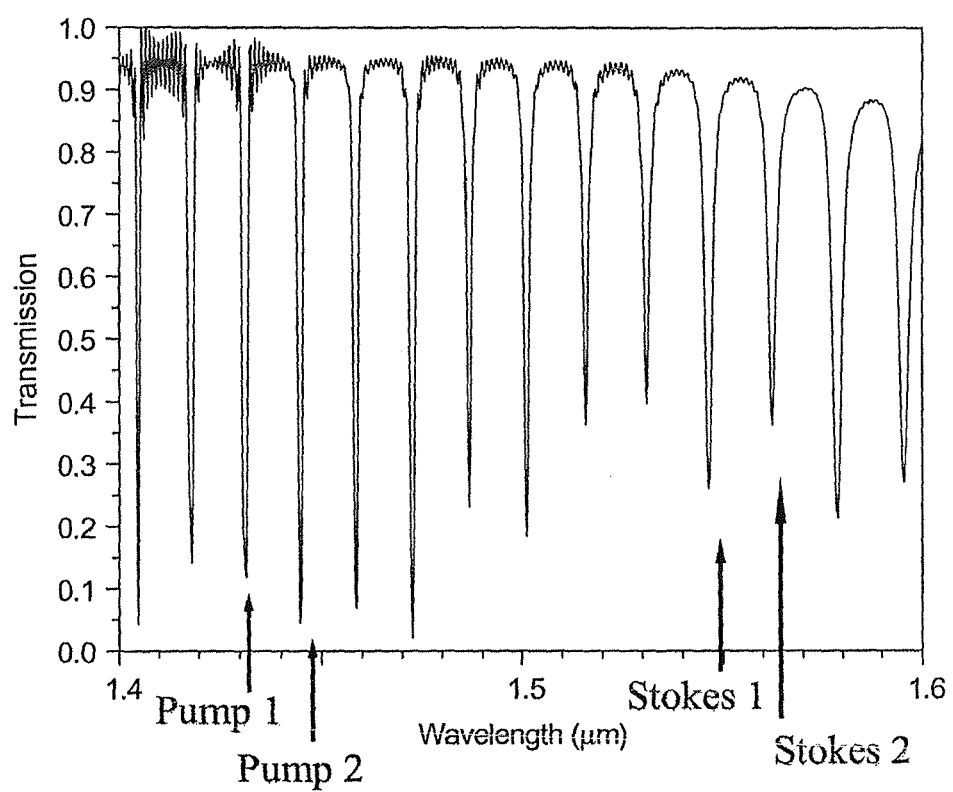
FIG. 2 is a transmission spectrum of a Raman amplification and lasing device according to one example of the present invention.

FIG. 2 illustrates the quasi-TE transmission spectrum near 1550 nm of waveguide 104 coupled with resonator 102 according to this example design. As shown, two pump lights (Pump 1 and Pump 2) can be selected from the transmission spectrum, with wavelengths $\lambda_{p1}$=1431.8 nm and $\lambda_{S1}$=1546.5 nm. Two corresponding Stokes lights (Stokes 1 and Stokes 2) have wavelengths $\lambda_{p2}$=1444.8 nm and $\lambda_{S2}$=1562.5 nm, which also correspond to drops of the transmission spectrum.

Figure 3:
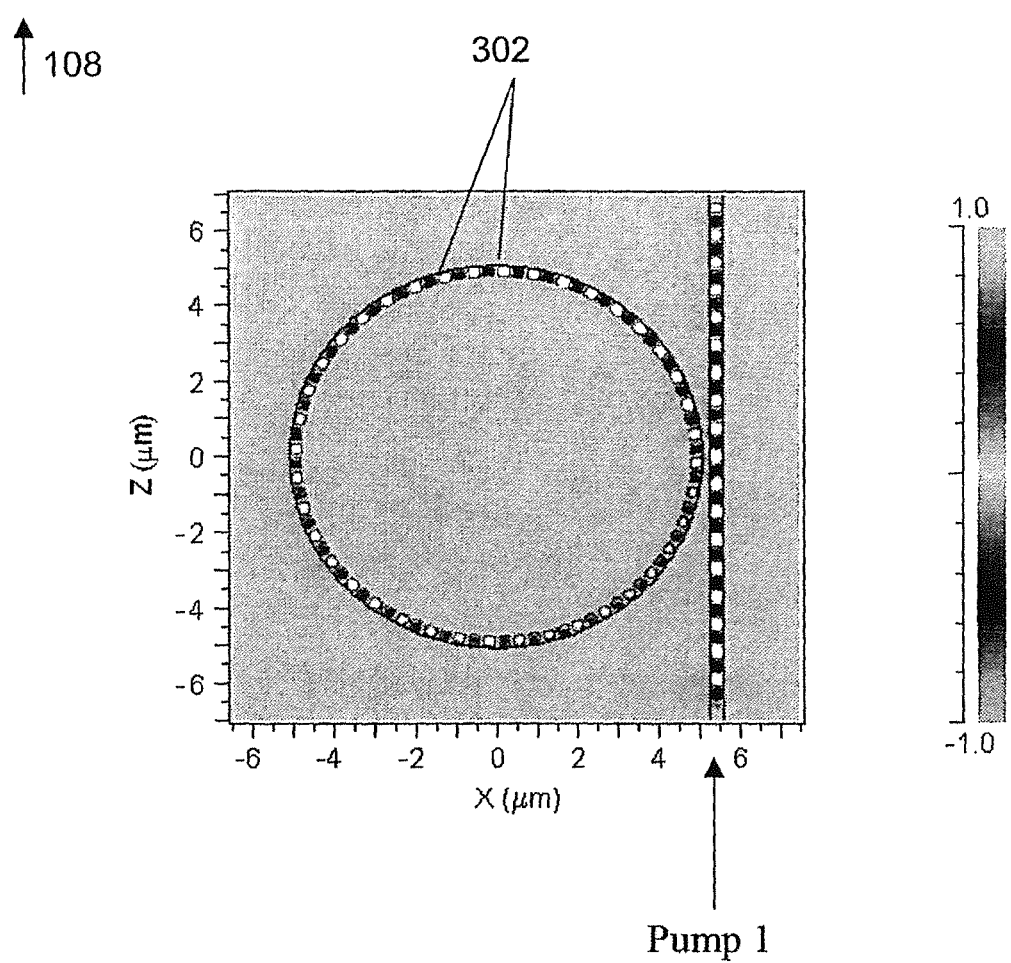
FIG. 3 is a diagram illustrating the WGMs formed by a beam of light in the same example device as used for FIG. 2.

FIG. 3 illustrates the WGMs of Pump 1 inside micro ring resonator 102 of this example with continuous wave excitation. The white dots 302 in resonator 102 are the locations having stronger Hy field (magnetic field in the Y direction). It can be seen that Pump 1 forms WGMs in resonator 102. The WGMs of Pump 1 in resonator 102 are caused by Pump 1 in waveguide 104 traveling in the direction of arrow 108 (Z direction).

Figure 4:
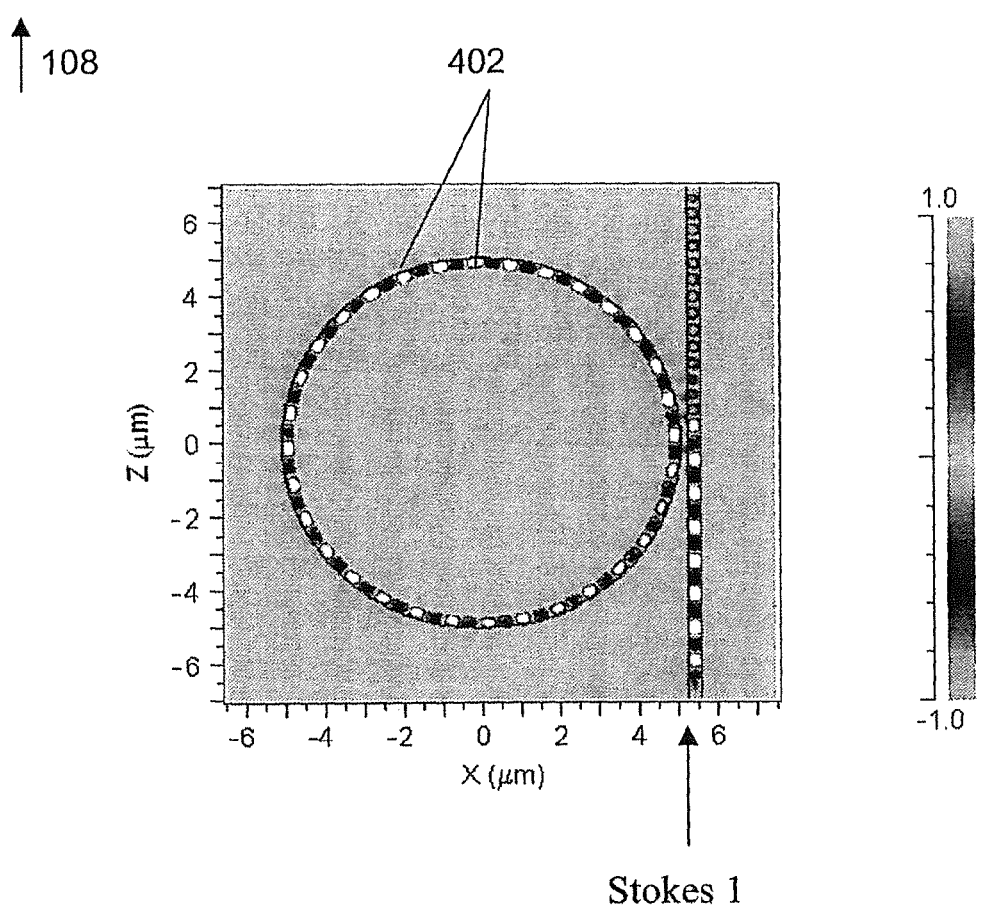
FIG. 4 is a diagram illustrating the WGMs formed by another beam of light in the same example device as used for FIG. 2.

FIG. 4 illustrates the WGMs of Stokes 1 inside micro ring resonator 102 of this example with continuous wave excitation. The white dots 402 in resonator 102 are the locations having stronger Hy field (magnetic field in the Y direction). It can be seen that Stokes 1 forms WGMs in resonator 102 as well. The WGMs of Stokes 1 in resonator 102 are caused by Stokes 1 in waveguide 104 traveling in the direction of arrow 108 (Z direction).

Therefore, device 100, according to the example design, supports the WGMs of both Pump 1 and Stokes 1. By SRS and coupling, Pump 1 in waveguide 104 can induce WGMs of both Pump 1 and Stokes 1 in micro ring resonator 102, and hence Stokes 1 in waveguide 104. Similarly, device 100, according to the example design, supports the WGMs of both Pump 2 and Stokes 2. It should be noted that the example geometry of device 100 is not the only geometry that can support WGMs of the required pump and Stokes frequencies.

Figure 5:
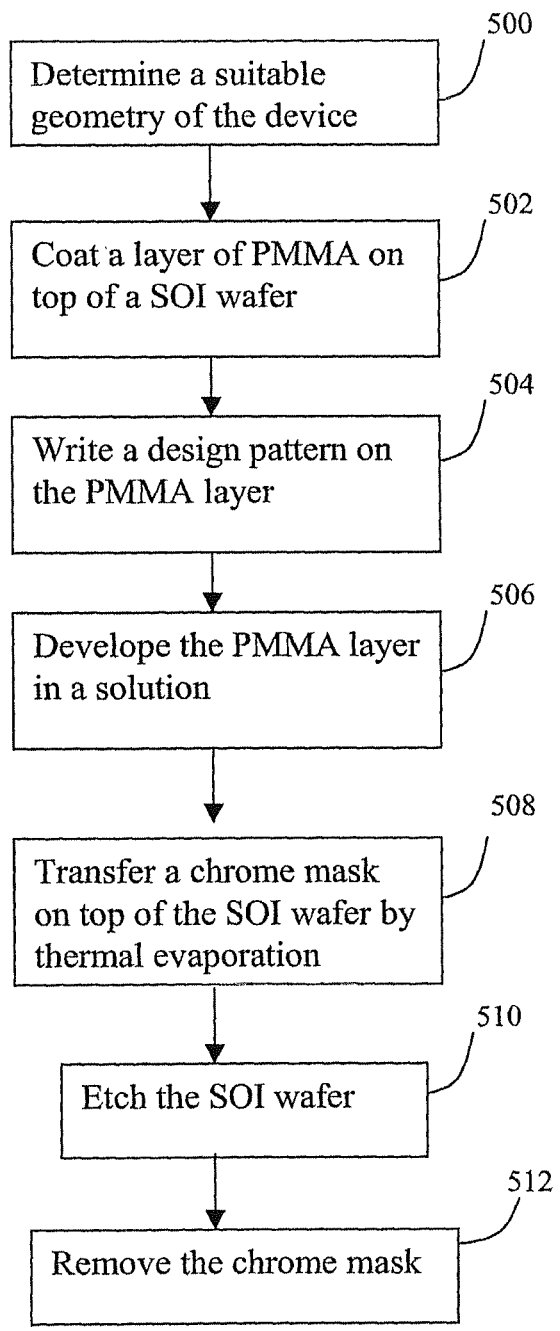
FIG. 5 is a flow chart illustrating methods for manufacturing a Raman amplification and lasing device according to various embodiments of the present invention.
Figure 6:
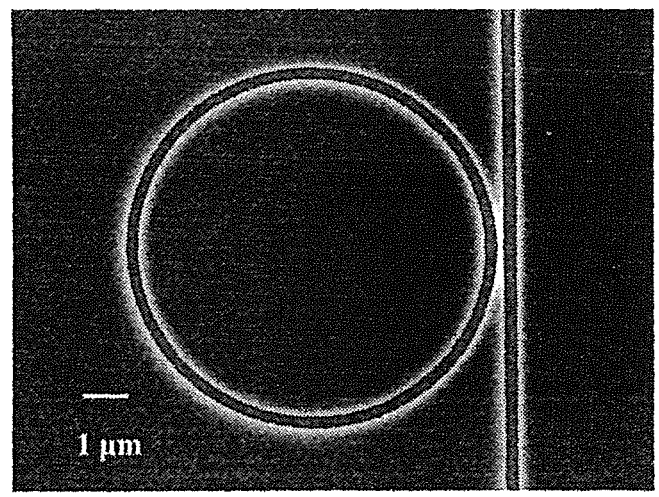
FIG. 6 is a top view of a fabricated Raman amplification and lasing device according to various embodiments of the present invention.

FIG. 5 is a flow chart illustrating various processes for manufacturing Raman amplification and lasing devices of various embodiments of the present invention. At 500, a suitable geometry of device 100 is determined. At 502, a layer of polymethylmethacrylate ("PMMA") can be coated on top of a silicon-on-insulator ("SOI") wafer. For example, a 200 nm thick 495 495K A6 PMMA can be spin-coated on top of a SOI wafer. At 504, a design pattern according to the determined geometry can be written on the PMMA layer by electron-beam lithography. At 506, the exposed PMMA layer can be developed in a solution. For example, a solution of methyl-butylisoketone ("MIBK") and isopropyl alcohol ("IPA") with MIBK:IPA=1:3 can be used to develop the PMMA layer for about 55 seconds. At 508, a chrome mask can be transferred on top of the SOI wafer by thermal evaporation. At 510, the SOI wafer can be etched to form the designs in the wafer, using, for example, inductively coupled plasma ("ICP") etching. At 512, the chrome mask can be removed. The wafer can be further packaged to seal the optical devices fabricated on the wafer. FIG. 6 is a top view of a fabricated Raman amplification and lasing device of various embodiments of the present invention captured by scanning electron microscopy ("SEM").

Each of the following applications, publications and patents are hereby incorporated by reference in their entirety: U.S. patent application Ser. No. 13/196,674, filed Aug. 2, 2011, published as U.S. 2011/0286489; U.S. patent application Ser. No. 12/392,634, filed Feb. 25, 2009, published as U.S. 2009/0191657, now U.S. Pat. No. 8,017,419; U.S. patent application Ser. No. 11/354,725, filed Feb. 15, 2006, published as U.S. 2007/0025409, now U.S. Pat. No. 7,532,656; and Provisional Application No. 60/653,556, filed Feb. 16, 2005.

Other embodiments, extensions, and modifications of the ideas presented above are comprehended and within the reach of one skilled in the art upon reviewing the present disclosure. Accordingly, the scope of the present invention in its various aspects should not be limited by the examples and embodiments presented above. The individual aspects of the present invention, and the entirety of the invention should be regarded so as to allow for modifications and future developments within the scope of the present disclosure. The present invention is limited only by the claims that follow.

We claim:

1. A method of facilitating a configuration for generating an electro-magnetic radiation, comprising:
   providing a ring arrangement having an interior dimension and at least one portion with a first cross-sectional dimension;
   providing at least one silicon waveguide arrangement having at least one portion with a second cross-sectional dimension; and
   disposing the waveguide at a predetermined distance from the ring arrangement,
   wherein at least one of the distance, the interior dimension, the first cross-sectional dimension, and the second cross-sectional dimension having values such that, during operation of the configuration, at least one first whispering gallery mode resonant frequency of the ring arrangement and at least one second whispering gallery mode resonant frequency of the ring arrangement are separated from one another based on an optical phonon frequency of silicon.

2. The method according to claim 1, wherein the electro-magnetic radiation includes a laser beam.

3. The method according to claim 1, wherein the ring arrangement comprises a silicon micro-ring.

4. The method according to claim 1, wherein the first and second whispering gallery mode resonant frequencies are separated from one another by the optical phonon frequency of silicon.

5. The method according to claim 1, wherein the first cross-sectional dimension approximately corresponds to the second cross-sectional dimension.

6. The method according to claim 1, wherein, during operation of the configuration, wavelengths corresponding to at least one of the at least one first whispering gallery mode resonant frequency or the at least one second whispering gallery mode resonant frequency are within a range of about 1400 nanometers to about 1600 nanometers.

7. A configuration for providing an electro-magnetic radiation, comprising:
a ring arrangement having an interior dimension and at least one portion with a first cross-sectional dimension; and
at least one silicon waveguide arrangement having at least one portion with a second cross-sectional dimension, the waveguide disposed at a distance from the ring arrangement,
wherein at least one of the distance, the interior dimension, the first cross-sectional dimension, and the second cross-sectional dimension having values such that, during operation of the configuration, at least one first whispering gallery mode resonant frequency of the ring arrangement and at least one second whispering gallery mode resonant frequency of the ring arrangement are separated from one another based on an optical phonon frequency of silicon.

8. The configuration according to claim 7, wherein the electro-magnetic radiation includes a laser beam.

9. The configuration according to claim 7, wherein the ring arrangement comprises a silicon micro-ring.

10. The configuration according to claim 7, wherein the first and second whispering gallery mode resonant frequencies are separated from one another by the optical phonon frequency of silicon.

11. The configuration according to claim 7, wherein the first cross-sectional dimension approximately corresponds to the second cross-sectional dimension.

12. The configuration according to claim 7, wherein, during the operation of the configuration, wavelengths corresponding to at least one of the at least one first whispering gallery mode resonant frequency or the at least one second whispering gallery mode resonant frequency are within a range of about 1400 nanometers to about 1600 nanometers.

13. The configuration according to claim 7, wherein the at least one waveguide arrangement includes a single-mode waveguide.

14. The configuration according to claim 7, wherein the at least one waveguide arrangement includes a quasi-transverse electric single-mode waveguide.

15. The configuration according to claim 7, wherein, during the operation, the at least one waveguide arrangement has a transmission spectrum with a plurality of drops.

16. The configuration according to claim 15, wherein neighboring ones of the drops are separated from one another by a free spectral range.

17. The configuration according to claim 16, wherein an optical phonon frequency of monolithic silicon approximately equals to an integer multiplied by the free spectral range.

18. The configuration according to claim 7, wherein at least one of the distance, the interior dimension, the first cross-sectional dimension, or the second cross-sectional dimension are provided based on a corresponding transmission spectrum of the waveguide which has a first drop at a pump frequency and a second drop at a Stokes frequency.

19. The configuration according to claim 18, wherein the pump frequency and the Stokes frequency differ from one another by the optical phonon frequency.

20. The configuration according to claim 7, further comprising at least one layer on which the ring arrangement and the at least one silicon waveguide arrangement are provided.

21. The configuration according to claim 20, wherein the at least one layer comprises at least one polymethylmethacrylate layer.

* * * * *